US012659534B2

(12) United States Patent
Chaudhari

(10) Patent No.: US 12,659,534 B2
(45) Date of Patent: Jun. 16, 2026

(54) REAL-TIME GEO-LOCKED CONTENT DELIVERY NETWORK TOKENS

(71) Applicant: HULU, LLC, Santa Monica, CA (US)

(72) Inventor: Pankaj Chaudhari, San Diego, CA (US)

(73) Assignee: HULU, LLC., Santa Monica, CA (US)

( * ) Notice: Subject to any disclaimer, the term of this patent is extended or adjusted under 35 U.S.C. 154(b) by 142 days.

(21) Appl. No.: 18/630,384

(22) Filed: Apr. 9, 2024

(65) Prior Publication Data

US 2025/0317614 A1     Oct. 9, 2025

(51) Int. Cl.
*H04N 21/266*      (2011.01)
*H04N 21/239*      (2011.01)
*H04N 21/258*      (2011.01)

(52) U.S. Cl.
CPC ... *H04N 21/26613* (2013.01); *H04N 21/2393* (2013.01); *H04N 21/25841* (2013.01)

(58) Field of Classification Search
CPC ......... H04N 21/26613; H04N 21/2393; H04N 21/25841
See application file for complete search history.

(56) References Cited

U.S. PATENT DOCUMENTS

| | | |
|---|---|---|
| 10,931,683 B2 | 2/2021 | Vinukonda et al. |
| 2013/0219178 A1* | 8/2013 | Xiques ................... H04L 65/70 |
| | | 713/168 |

| | | | |
|---|---|---|---|
| 2015/0254635 A1* | 9/2015 | Bondesen .............. G06Q 20/36 |
| | | | 705/41 |
| 2019/0312884 A1* | 10/2019 | Vinukonda .......... H04L 65/612 |
| 2022/0191567 A1* | 6/2022 | Wei ................... H04N 21/25841 |
| 2022/0353081 A1 | 11/2022 | Duvdevani et al. |

OTHER PUBLICATIONS

European Search Report and Search Opinion Received for EP Application No. 25165767.2, mailed on Jul. 18, 2025, 16 pages.
https://en.wikipedia.org/wiki/Geohash.
https://www.movabletypeco.uk/scripts/geohash.html.

* cited by examiner

*Primary Examiner* — Nicholas T Corbo
(74) *Attorney, Agent, or Firm* — Patterson + Sheridan, LLP; Gero G. McClellan

(57) ABSTRACT

Techniques for providing streaming content include receiving a first request, from a first user, for a link to streaming content. These techniques further include determining a geographic location of the first user based on the first request, generating a geo-specific token describing the geographic location of the first user, and transmitting the link to the streaming content to the first user, the link including the geo-specific token. The techniques further include receiving a second request for the streaming content based on the link, the second request comprising the geo-specific token, and denying the second request for the streaming content based on comparing the geo-specific token with additional geographic information determined based on the second request.

20 Claims, 6 Drawing Sheets

400

Start

402 — Subscriber Requests Playback Link

404 — Content Provider Generates Geo-Specific Link

406 — Subscriber Requests Content using Geo-Specific Link

408 — CDN Evaluates GEO-Specific Link

410 — CDN Provides Content to Subscriber

End

REAL-TIME GEO-LOCKED CONTENT DELIVERY NETWORK TOKENS

BACKGROUND

Streaming content is commonly provided to an authorized user, by a content provider, via a link to a Content Delivery Network (CDN). But sharing these links from the authorized user to un-authorized users can provide unauthorized access to the content. For example, an authorized subscriber to a streaming platform can share a CDN playback uniform resource identifier (e.g., a uniform resource locator (URL)) with a non-subscriber. The non-subscriber may be able to access that playback URL outside of the content provider's platform and hence be able to play the content against the CDN. This has significant drawbacks, including overloading the CDN and content provider networks and harming the playback experience for authorized users.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
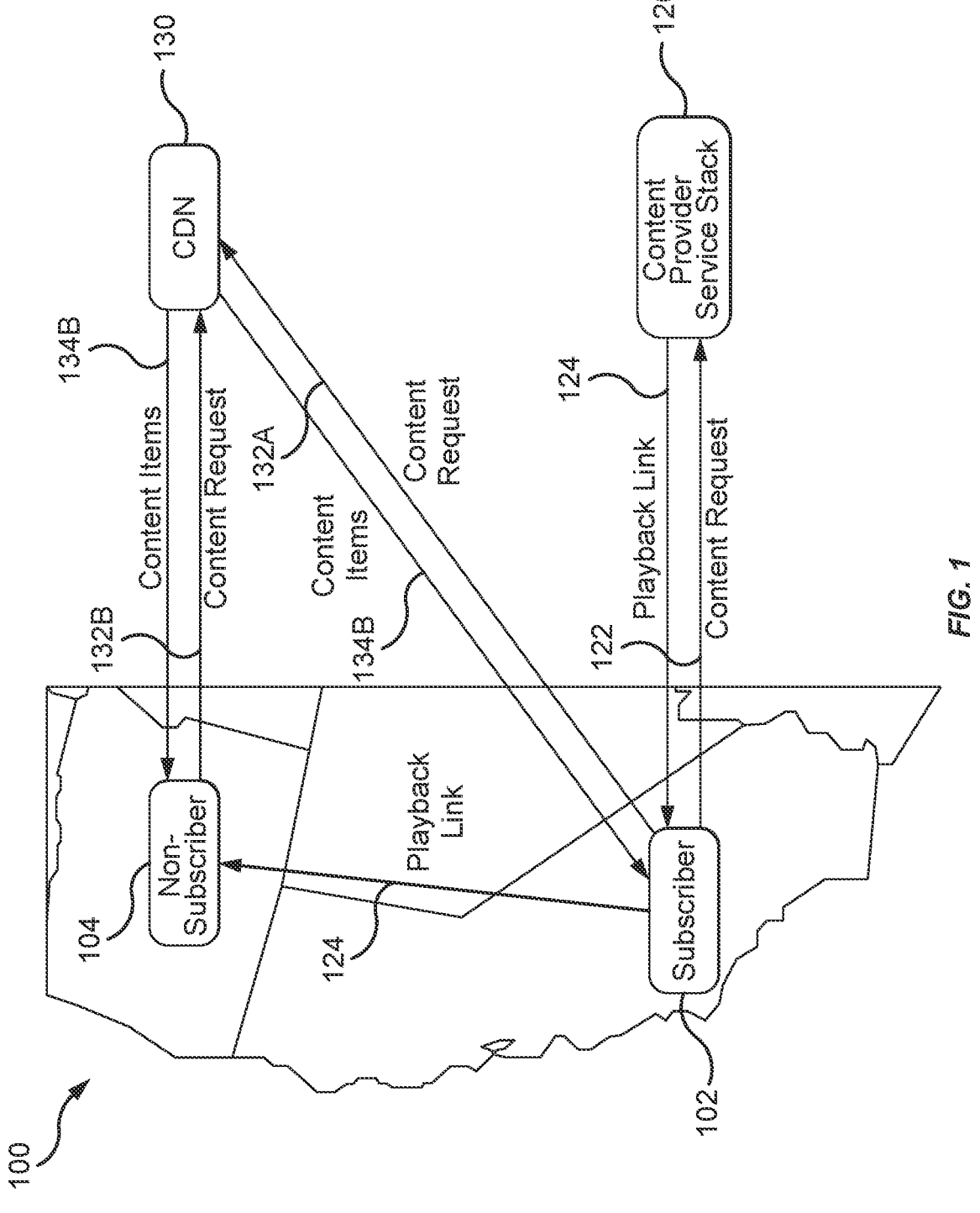
FIG. 1 is a block diagram illustrating a computing environment for geo-locked content delivery tokens, according to at least one embodiment.

As discussed above, CDN link sharing from authorized to un-authorized users can cause significant problems for a content provider (e.g., a streaming platform). One possible solution is to use digital rights management (DRM) techniques to control access to the content. DRM typically requires a DRM client on the subscriber's player that enforces content rights. With DRM, sharing of a playback URL with a non-subscriber may be possible, but the content is encrypted due to use of DRM and so the non-subscriber is generally unable to access the necessary DRM license required to decrypt the content.

Using DRM can make it harder to link-share content, but has drawbacks. For example, DRM can be bypassed in some circumstances, particularly on some low security viewing devices. Further, introduction of DRM can require a significant modification across a content provider's media platform and significant computational overhead. DRM requires the additional work of encryption, key management, license servers and DRM clients. This is both developmentally, and computationally, expensive.

Another possible solution is token revocation. Token revocation relies on a tokenized URL where the token contains a subscriber identifier (e.g., direct or indirect identification), expiration time, and other suitable information. Such a token can be referred to as an individualized token. When a subscriber shares their tokenized URL with a non-subscriber, a CDN remains unable to detect link sharing, because the token is likely valid at that time (e.g., based on expiration time and URL path).

But a content provider can analyze use of that individualized token (e.g., using a backend system and information provide by a CDN) to identify suspect access patterns. The content provider can then coordinate with the CDN to revoke access for that token. One downside of token revocation, however, is that takes a reactive approach to detection and prevention. Further, it relies on logging activity at CDN (e.g., potentially generating voluminous logs and requiring significant computational bandwidth) and ingesting signaling from CDNs to identify suspect use (e.g., based on heuristics or rules). This can be both inaccurate, resulting in false positives and false negatives, and a computational burden on the system (e.g., because of signaling required between the CDN and content provider and analysis required by one, or both, systems).

One or more embodiments described herein build on the use of CDN access tokens by including a geographic aspect within the token. In an embodiment, the content provider generates a geo-locked token based on the geographic location of the requestor, and this geo-locked token is provided to the requestor as part of the content link (e.g., as part of a URL) so that the geo-locked token is used when requesting content from the CDN. To play the content, the geographic location of the user accessing the link to request content from the CDN must match the geographic location of the user that requested the content from the content provider, memorialized in the geo-locked token.

In an embodiment, geo-locked tokens provide an active approach to security based on the premise that the subscriber's geographic location typically does not change significantly in the very small window between accessing a content provider and requesting content from a CDN. This allows for a real-time approach to prevent unauthorized users from accessing content. Further, it is relatively low cost in terms of computation and implementation because the geographic location of the requesting user can be readily accessed using the user's internet protocol (IP) address or other geographic information, and no new workflows need to be built across CDN and content providers. In an embodiment, the use of geo-locked tokens can provide active security (e.g., as opposed to the reactive security provided by token revocation) without requiring DRM.

Further, the use of geo-locked tokens has many technical advantages over prior solutions. For example, as discussed above, minimal development changes are needed across the computing environment (e.g., as opposed to a DRM solution) and the significant computational overhead associated with DRM is avoided. As another example, the use of geo-locked tokens can be stateless and asynchronous and does not require capturing and maintaining logs at the CDN (e.g., as opposed to a token revocation solution). This significantly reduces the computational and storage burden of the system, as we all as reducing development time and resources.

FIG. 1 is a block diagram illustrating a computing environment 100 for geo-locked content delivery tokens, according to at least one embodiment. In an embodiment, the computing environment 100 includes a subscriber 102 to a content service (e.g., a streaming service). The subscriber 102 accesses the content through a content provider, which operates a content provider services stack 120 as part of a content provider computational environment. The content provider services stack 120 controls access to the content and, where a subscriber is authorized to access content, provides a link to a CDN 130 that hosts the content and provides the content to the subscriber 102.

For example, the subscriber 102 transmits a content request 122 to the content provider services stack 120. In an embodiment, the subscriber 102 uses a suitable computing device (e.g., a laptop computer, desktop computer, smartphone, tablet, Internet of Things (IoT) device, smart television device, wearable device, digital media player device, gaming device, or any other suitable computing device) to access the content provider services stack 120 using a suitable communication network. This is discussed further below.

In an embodiment, the content provider services stack 120 validates the request (e.g., verifies that the subscriber is authorized to access the requested content) and responds with a playback link 124. In an embodiment, the playback link 124 includes a link to a suitable CDN (e.g., the CDN 130) which hosts the content. For example, the playback link 124 can include a URL identifying a storage location for the content at the CDN 130.

As illustrated, the subscriber 102 uses the playback link 124 to access the content at the CDN 130. For example, the subscriber 102 can use a URL included in the playback link 124 to transmit a content request 132A to the CDN 130. The CDN 130 can then respond with one or more content items 134A (e.g., streaming video content items, streaming audio content items, streaming video game content items, or any other suitable content items).

In an embodiment, the subscriber 102 is authorized to access requested content from the content provider services stack 120, but the non-subscriber 104 is not authorized to access this content (e.g., the non-subscriber 104 does not maintain a suitable subscription to access the content). The subscriber 102 may be able to provide the non-subscriber 104 with unauthorized access to the content by sharing the playback link 124.

For example, the subscriber 102 could share the playback link 124 with the non-subscriber 104. The non-subscriber 104 can use the playback link 124 (e.g., a URL included in the playback link 124) to transmit a content request 132B to the CDN 130. The CDN 130 can respond to the content request 132B with one or more content items 134B, providing the content to the non-subscriber 104 despite the lack of authorization for the non-subscriber 104 to access the content.

As discussed further below in relation to FIGS. 3-6, in an embodiment the content provider services stack alleviates this problem by providing a geo-locked token in the playback link 124. In an embodiment, the content provider services stack 120 uses a geographic location of the subscriber 102 to generate a token limiting access to the content to the requisite geographic location. The subscriber 102 includes the token it received from the content provider services stack 120 in the content request 132A to the CDN 130 (e.g., as part of a URL provided with the playback link 124), and the CDN 130 provides access to the content based on comparing the geographic location of the requesting subscriber 102 with the geographic location recorded in the content request 132A. By contrast, if the subscriber 102 attempts to share the playback link 124 with a non-subscriber 104 in a different geographic location, the CDN 130 can decline to provide access to the content based on a disparity in the actual geographic location of the non-subscriber 104 compared with the expected geographic location in the content request 132B. As noted, this is discussed further, below, with regard to FIGS. 3-6.

In an embodiment, the various components of the computing environment 100 communicate using one or more suitable communication networks, including the Internet, a wide area network, a local area network, or a cellular network, and uses any suitable wired or wireless communication technique (e.g., WiFi or cellular communication). Further, in an embodiment, the content provider services stack 120 and CDN 130 can be implemented using any suitable combination of physical compute systems, cloud compute nodes and storage locations, or any other suitable implementation.

For example, the content provider services stack 120 and CDN 130 could each be implemented using a respective server or cluster of servers. As another example, the content provider services stack 120 and CDN 130, can be implemented using a combination of compute nodes and storage locations in a suitable cloud environment. For example, one or more of the components of the content provider services stack 120 and CDN 130 can be implemented using a public cloud, a private cloud, a hybrid cloud, or any other suitable implementation. Further, the subscriber 102, non-subscriber 104, or both, can be implemented using any number or combination of computing devices.

Figure 2:
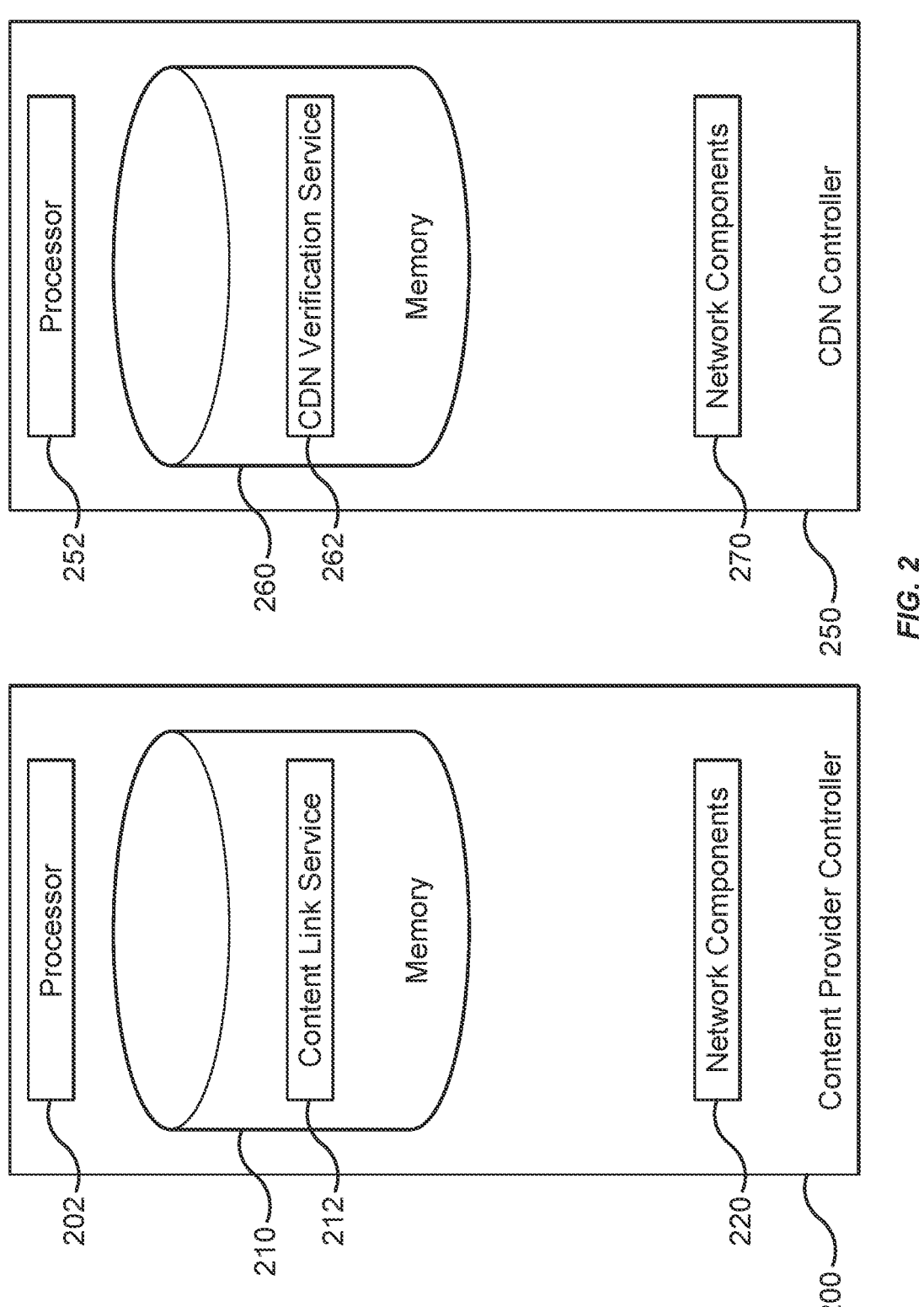
FIG. 2 is a block diagram illustrating controllers for geo-locked content delivery tokens, according to at least one embodiment.

FIG. 2 is a block diagram illustrating controllers for geo-locked content delivery tokens, according to at least one embodiment. In an embodiment, the content provider controller 200 corresponds with one aspect of the content provider services stack 120 illustrated in FIG. 1. The content provider controller 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the content provider controller 200 to interface with components over a network (e.g., as illustrated in FIG. 1). For example, the content provider controller 200 can be a part of the content provider services stack, and the content provider controller 200 can use the network components 220 to interface with remote storage and compute nodes using the network components (e.g., the subscriber 102, non-subscriber 104, CDN 130, or any other suitable components). Alternatively, or in addition, the content provider controller 200 can correspond with a different part of the computing environment 100 (e.g., the CDN 130 or another suitable location).

The content provider controller 200 can interface with other elements in the system over a local area network (LAN), for example an enterprise network, a wide area network (WAN), the Internet, or any other suitable network. The network components 220 can include wired, WiFi or cellular network interface components and associated software to facilitate communication between the content provider controller 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the content provider controller 200. The program code is generally described as various functional "applications" or "services" within the memory 210, although alternate implementations may have different functions and/or combinations of functions. Within the memory 210, a content link service 212 facilitates generating geo-locked content delivery tokens. This is discussed further below with regard to subsequent figures.

In an embodiment, the CDN controller 250 corresponds with one aspect of the CDN 130 illustrated in FIG. 1. The CDN controller 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the CDN controller 250 to interface with components over a network (e.g., as illustrated in FIG. 1). For example, the CDN controller 250 can be a part of the CDN 130, and the CDN controller 250 can use the network components 270 to interface with remote storage and compute nodes using the network components (e.g., the subscriber 102, non-subscriber 104, content provider services stack 120, or any other suitable components). Alternatively, or in addition, the CDN controller 250 can correspond with a different part of the computing environment 100 (e.g., the content provider services stack 120 or another suitable location).

The CDN controller 250 can interface with other elements in the system over a local area network (LAN), for example an enterprise network, a wide area network (WAN), the Internet, or any other suitable network. The network components 270 can include wired, WiFi or cellular network interface components and associated software to facilitate communication between the CDN controller 250 and a communication network.

Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory. The memory 260 generally includes program code for performing various functions related to use of the CDN controller 250. The program code is generally described as various functional "applications" or "services" within the memory 260, although alternate implementations may have different functions and/or combinations of functions. Within the memory 260, a CDN verification service 262 facilitates verifying geo-locked content delivery tokens. This is discussed further below with regard to subsequent figures.

Although FIG. 2 depicts the content link service 212 as located in the memory 210 and the CDN verification service 262 as located in the memory 260, that representation is merely provided as an illustration for clarity. More generally, the content provider controller 200 and CDN controller 250 may each, respectively, include one or more computing platforms, such as computer servers for example, which may be co-located, or may form an interactively linked but distributed system, such as a cloud-based system (e.g., a public cloud, a private cloud, a hybrid cloud, or any other suitable cloud-based system). As a result, the processors 202 and 252 and the memories 210 and 260 may correspond to distributed processor and memory resources within a computing environment.

Figure 3:
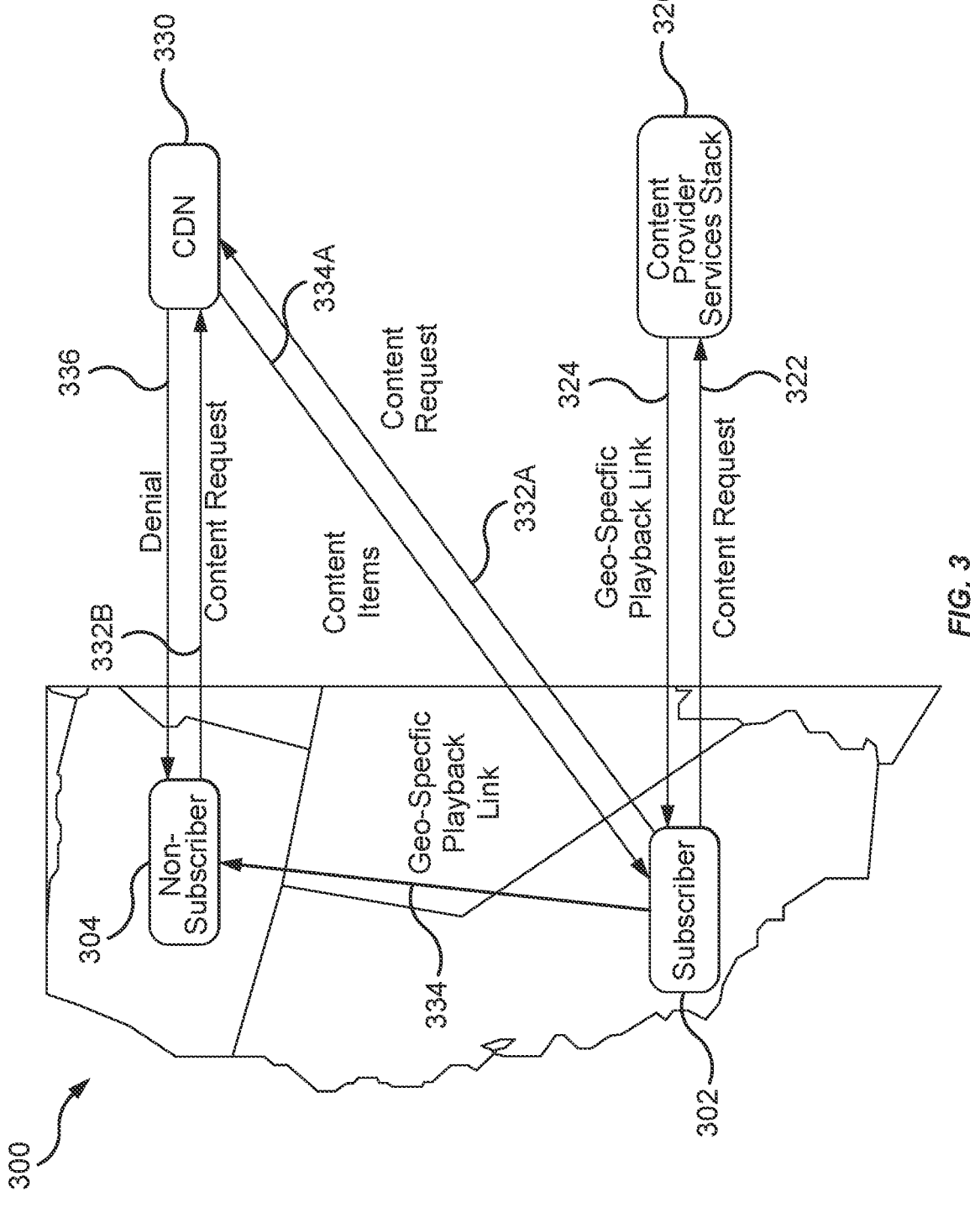
FIG. 3 illustrates geo-locked content delivery to authorized users, according to at least one embodiment.

FIG. 3 illustrates geo-locked content delivery to authorized users, according to at least one embodiment. In an embodiment, the computing environment 300 includes a subscriber 302 to a content service (e.g., a streaming service). As described in FIG. 1, the subscriber 302 can access content from a CDN 330 through a request to a content provider services stack 320 that is part of a content provider computational environment (e.g., just as the subscriber 102 illustrated in FIG. 1 can access content from the CDN 130). In an embodiment, however, in the computing environment 300 illustrated in FIG. 3 the content provider services stack 320 provides a geo-specific playback link 324 which can be used to protect against unauthorized access by a non-subscriber 304 in a different geographic location from the subscriber 302.

For example, the subscriber 302 can transmit a content request 322 (e.g., using a suitable computing device and communication network, as described in relation to FIG. 1) to the content provider services stack 320. In an embodiment, the content provider services stack 320 validates the request (e.g., verifies that the subscriber is authorized to access the requested content) and generates a geo-specific playback link.

For example, the content provider services stack 320 can use information included in the content request 322 to determine a geographic location of the subscriber 302 (e.g., an IP address of the subscriber, or any other suitable information). The content provider services stack can use the geographic location to generate the geo-specific playback link 324. For example, the content provider can generate a URL (e.g., identifying the storage location of the content at the CDN 330) that includes a geo-specific token (e.g., a token identifying the geographic location of the subscriber 302). This is discussed further, below, with regard to FIGS. 4-6.

As illustrated, the subscriber 302 uses the geo-specific playback link 324 to access the content at the CDN 330. For example, the subscriber 302 can use a URL included in the geo-specific playback link 324 to transmit a content request 332A to the CDN 330. The CDN 330 can validate the request. For example, the CDN 330 can use a geo-specific token included in the content request 332A, along with information describing the current geographic location of the subscriber 302 (e.g., an IP address of the subscriber 302) to determine that the content request 332A to the CDN originates from the same geographic location as the content request 322 to the content provider services stack. After validating the content request 332A, the CDN 330 can respond with one or more content items 334A (e.g., streaming video content items, streaming audio content items, streaming video game content items, or any other suitable content items).

As in FIG. 1, in an embodiment, the subscriber 302 is authorized to access requested content from the content provider services stack 320, but the non-subscriber 304 is not authorized to access this content (e.g., the non-subscriber 304 does not maintain a suitable subscription to access the content). The subscriber 302 may share the geo-specific playback link 324 with the non-subscriber 304

(e.g., intentionally or unintentionally) in a different geographic location from the subscriber 302. Unlike in FIG. 1, however, the non-subscriber 304 cannot access the requested content, because of the geo-specific playback link 324.

For example, the non-subscriber 304 can use the geo-specific playback link 324 (e.g., a URL included in the geo-specific playback link 324 and including a geo-specific token) to transmit a content request 332B to the CDN 330. The CDN 330 can validate the request. For example, the CDN 330 can compare geographic information included in the geo-specific playback link 324 (e.g., a geo-specific token) with geographic information included in the content request 332B and identifying the geographic location of the non-subscriber 304 (e.g., an IP address of the non-subscriber 304). Because the non-subscriber 304 is in a different geographic location from the subscriber 302, the geographic information included in the geo-specific playback link 324 does not match the geographic information included in the content request 332B that identifies the geographic location of the non-subscriber 304 (e.g., the geo-specific token included in the geo-specific playback link 324 does not match the geographic location indicated by the IP address of the non-subscriber 304). Therefore, the CDN 330 returns a denial 336 (e.g., instead of content items). As described further below with regard to FIG. 6, this denial can including an error, an initiation of a re-request by the subscriber 302, or any other suitable denial action.

Just as in FIG. 1, in an embodiment, the various components of the computing environment 300 communicate using one or more suitable communication networks, including the Internet, a wide area network, a local area network, or a cellular network, and uses any suitable wired or wireless communication technique (e.g., WiFi or cellular communication). Further, in an embodiment, the content provider services stack 320 and CDN 330 can be implemented using any suitable combination of physical compute systems, cloud compute nodes and storage locations, or any other suitable implementation.

For example, the content provider services stack 320 and CDN 330 could each be implemented using a respective server or cluster of servers. As another example, the content provider services stack 320 and CDN 330, can be implemented using a combination of compute nodes and storage locations in a suitable cloud environment. For example, one or more of the components of the content provider services stack 320 and CDN 330 can be implemented using a public cloud, a private cloud, a hybrid cloud, or any other suitable implementation. Further, the subscriber 302, non-subscriber 304, or both, can be implemented using any number or combination of computing devices.

Figure 4:
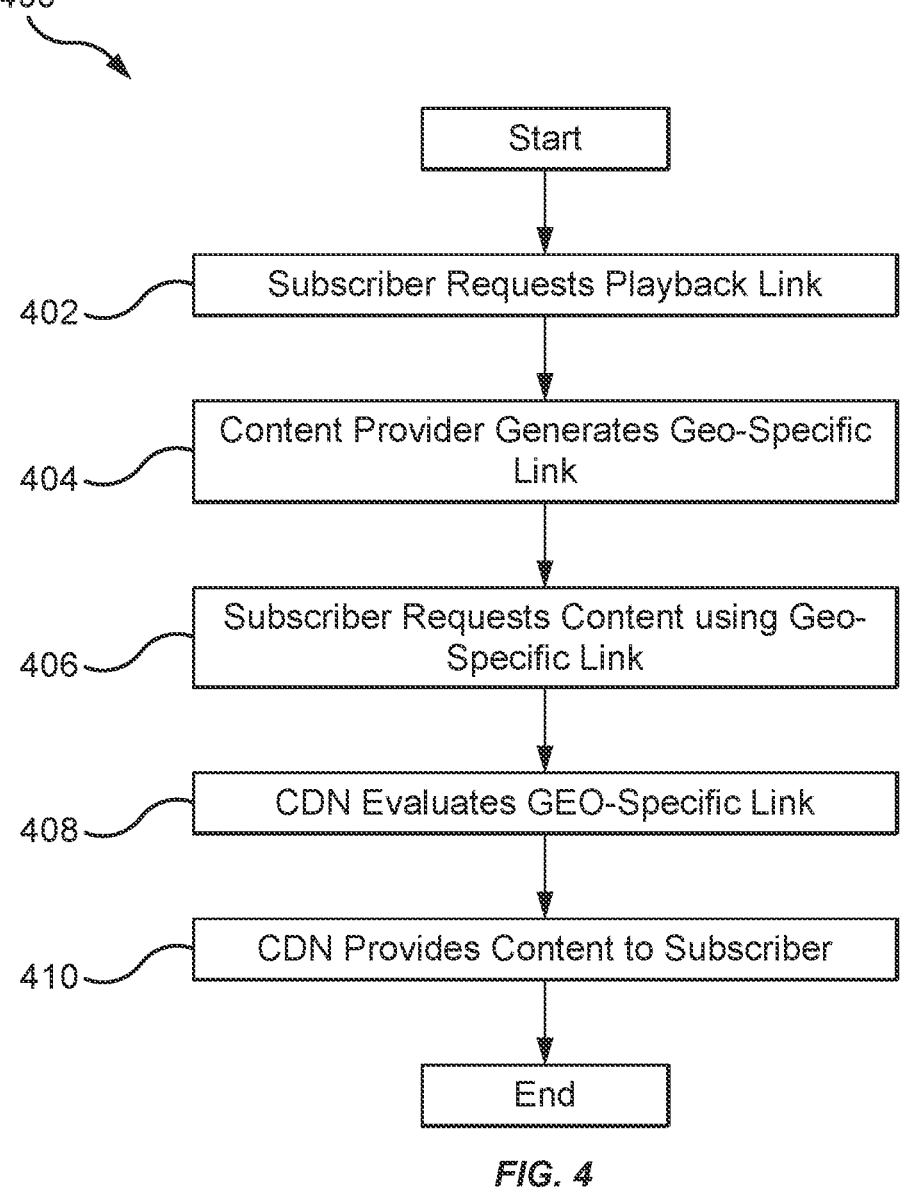
FIG. 4 is a flowchart illustrating geo-locked content delivery to authorized users, according to at least one embodiment.

FIG. 4 is a flowchart 400 illustrating geo-locked content delivery to authorized users, according to at least one embodiment. At block 402 a subscriber (e.g., the subscriber 302 illustrated in FIG. 3) requests a playback link. For example, the subscriber can transmit a network message to a content provider controller (e.g., the content provider controller 200 illustrated in FIG. 2) using a suitable communication network (e.g., the Internet, a LAN, a WAN, a cellular communication network, or any other suitable communication network).

At block 404, the content provider generates a geo-specific link. In an embodiment, a content link service (e.g., the content link service 212 illustrated in FIG. 2) can use information in the playback link request to identify the geographic location of the subscriber. This is discussed further, below, with regard to FIG. 5. For example, the content link service can use an IP address of the subscriber, or any other suitable information, to identify the geographic location of the subscriber. Further, as discussed below in relation to FIG. 5, the content link service can identify the geographic location at a suitable level of granularity (e.g., city, county, state, residential region, or any other suitable level of granularity). The content link service can generate a token identifying this geographic location, and can include this token in a link provided to the subscriber (e.g., a URL).

At block 406, the subscriber requests content using the geo-specific link. In an embodiment, the link identifies a content item at a suitable CDN, and the subscriber follows the link to the retrieve the content. For example, the geo-specific link can be a URL including a geo-specific token. The subscriber can access the URL to retrieve content from the CDN.

At block 408, the CDN evaluates the geo-specific link. In an embodiment, the content request from the subscriber includes both the current geographic location of the subscriber (e.g., an IP address or other geographic identifier) and the geo-specific link generated by the content link service of the content provider (e.g., a URL including a geo-specific token). A CDN verification service (e.g., the CDN verification service 262 illustrated in FIG. 2) compares the current geographic location of the subscriber with the expected geographic location recorded in the geo-specific link. If the geographic locations match, the CDN verification service fulfills the request. If not, the CDN verification service does not fulfill the request.

In an embodiment, the CDN can evaluate the geo-specific link for every received content request. Alternatively, or in addition, the CDN can evaluate the geo-specific link at defined times. For example, the CDN could evaluate the geo-specific link only at the start of content playback (e.g., for mobile devices that may move during playback), or at periodic intervals. In an embodiment, this can avoid errors where a valid subscriber is moving geographic locations (e.g., viewing content as a passenger in a moving vehicle) by limiting the number of evaluations. Further, in an embodiment, the CDN verification service can use a radius around the geographic location (e.g., the current geographic location, the expected geographic location, or both) to account for physical movement of the subscriber. For example, the CDN verification service can define a desired radius (e.g., a distance around a given point described by a latitude and longitude) as a cushion around the geographic location. This desired radius can be hard-coded or configurable (e.g., prior to operation or at runtime). If the current and expected geographic locations match, within this radius, the request can be evaluated as valid.

At block 410, the CDN provides content to the subscriber. In an embodiment, the CDN verification service determines that the geographic location of the requesting subscriber matches the geographic location described in the geo-specific link (e.g., the URL token). The CDN then provides the content to the subscriber.

Figure 5:
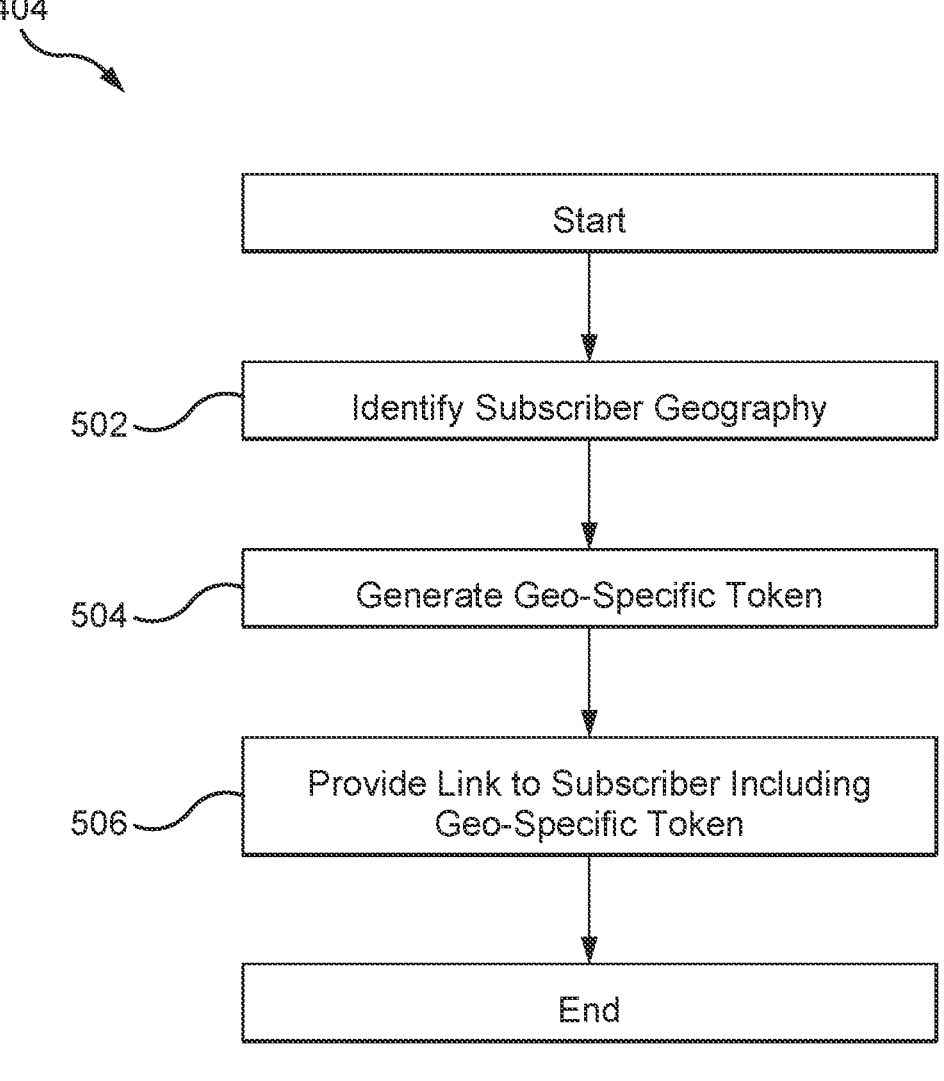
FIG. 5 is a flowchart illustrating generating a geographic specific link for geo-locked content delivery to authorized users, according to at least one embodiment.

FIG. 5 is a flowchart illustrating generating a geographic specific link for geo-locked content delivery to authorized users, according to at least one embodiment. In an embodiment, FIG. 5 corresponds with block 404 illustrated in FIG. 4. At block 502, a content link service (e.g., the content link service 212 illustrated in FIG. 5) identifies subscriber geography. For example, a request to the content link service (e.g., from a subscriber) can include an IP address of the requestor (e.g., of the subscriber). The content link service can use the IP address to identify the geographic location of the requestor (e.g., using a lookup table or another suitable technique).

The use of an IP address is merely an example, and the content link service can use any suitable technique to identify a geographic location of the requestor (e.g., a cellular network identifier, an application specific identifier, or any other suitable technique). For example, the request to the content link service may include latitude and longitude information, cellular network geographic identification (e.g., base station or subscriber identification information), network service provider headers, or any other suitable information. The content link service can resolve this information to identify the geographic location of the requestor.

In an embodiment, the requestor could use a virtual private network (VPN), or another technique, to attempt to mask the true geographic location of the requestor. For example, the requestor could use a VPN to provide to the content link service an IP address that matches the requestor's desired geographic location (e.g., to allow for unauthorized content sharing), rather than the requestor's actual geographic location. In an embodiment, the content link service (or any other suitable software service) can take appropriate countermeasures for this scenario. For example, the content link service can use VPN detection and bar retrieval of content by a requestor using a VPN. This is merely an example, and the content link service can take any suitable countermeasures (e.g., relying on geographic identification information apart from, or in addition to, an IP address).

In an embodiment, the content link service can identify the requestor's geographic location at a preferred level of granularity. For example, the content link service could identify the geographic location at any of a country level, state level, county level, city level, intra-city (e.g., neighborhood or other region) level, or any other suitable level of granularity. The level of granularity can be configured by a content provider, determined prior to operation, or determined using any other suitable technique. In an embodiment, ISO 3166-2 coding can be used, in which each country is divided into subdivisions with assigned codes. For example, under ISO 3166-2 the United States of America is designated with the code US and subdivisions for 50 states, 1 district, and 6 outlying areas.

In an embodiment, the content link service can use geo-hashing techniques to identify a geographic location at a preferred level of granularity (e.g., in addition to, or as an alternative to, ISO 3166-2 coding). In an embodiment, geohashing encodes a geographic location into a hierarchical code value (e.g., a combination of numbers and letters) denoting the location. For example, geohashing can include subdividing a geographic space into buckets of grid shape (e.g., using a space-filling curve). Typically, the longer the code the more precise the geographic designation (e.g., adding a symbol to the code increases the granularity, while removing a symbol from the code decreases the granularity). In an embodiment, geohashing can be implemented to cover a wide range of granularities, from 10s of kilometers to 100s or even thousands of kilometers.

In an embodiment, the granularity of geographic location can be determined based on a number of factors. For example, the geographic location of a requestor (e.g., a subscriber) can be determined based on a lookup of the requestor's IP address. But these lookups can vary widely in accuracy, potentially resulting in inconsistent results and false positives or negatives. Further, a mix of IPV4 and IPV6 addresses (e.g., for a given requestor) can result in differing geographic lookups (e.g., an IPv4 address may return one location while an IPV6 address for the same user may return a different location). This can also result in errors. In an embodiment, a level of granularity can be chosen so that the geographic location of the requestor is sufficiently specific to protect against unauthorized access by others, but sufficiently general to avoid a negative user experience from inaccurate or inconsistent IP lookups.

Another potential consideration is movement of the requestor. In an embodiment, a requestor may be traveling (e.g., in an automobile, train, airplane, or other vehicle). A granular geographic location could result in errors because a user could move geographic locations in the time between a request to the content provider services stack and a request to a CDN. For example, a viewer in a car could be in one location when requesting content from the content provider services stack, could receive a geo-specific playback link tied to that first location, and could be in a second location by the time the user requests content from the CDN. If the geographic locations are designated at too specific a level of granularity, the user could be incorrectly denied access based on this movement. In an embodiment, the geographic location of the user is defined sufficiently broadly to avoid, or decrease, these errors.

Alternatively, or in addition, as discussed above in relation to block 408 illustrated in FIG. 4, potential movement of requestors can be addressed by evaluating the geo-specific link only at defined times (e.g., only at the start of content playback or at periodic intervals), by defining a desired radius around the geographic location for the evaluation, or by any suitable combination of techniques. As one example, a CDN verification service (or any other suitable software service) can evaluate the geo-specific link at the start of playback only. This limits the time between generation of the geo-specific token and evaluation of the geo-specific link to a very short period (e.g., less than a minute), reducing the likelihood that a requestor could have moved far enough geographically to create an error.

Further, the CDN verification service can modify the frequency of evaluation, the geographic radius or granularity, or any other suitable characteristic, based on whether the requestor is a mobile device. For example, movement of a requestor is likely only to be an issue for mobile devices. The CDN verification service can use information in the request, or any other suitable information, to identify the requestor as a mobile device, and can change the evaluation flow (e.g., the frequency or timing, radius, or granularity) based on this identification. This can result in different evaluation techniques (e.g., less frequent evaluation, less granular geographic identification, a larger radius around the geographic location, or any other suitable difference) for mobile devices, to avoid incorrectly denying access to authorized users, and more frequent evaluation for other devices.

At block 504 the content link service generates a geo-specific token. In an embodiment, the token includes the detected geographic location of the requestor, at the desired level of granularity. For example, the token can correspond to an ISO 3166-2 code, a geohash, a combination of the two, or any other suitable value.

At block 506, the content link service provides a link to the subscriber including the geo-specific token. For example, the content link service can provide a URL to the subscriber including the geo-specific token as a property of the URL. The token can be, as one example, a field or property embedded in the URL (e.g., a key: value pair in the URL) and reflecting the geographic location of the requestor (e.g., a string of characters included in a URL reflecting the geographic location). This is merely one example, and the geo-specific token can be any suitable value using any suitable technique. In an embodiment, the token can be obfuscated for security so that the requestor cannot identify or modify the value. For example, the token can be encrypted (e.g., using public-key encryption), encoded, hashed, or modified with any other suitable obfuscation.

Figure 6:
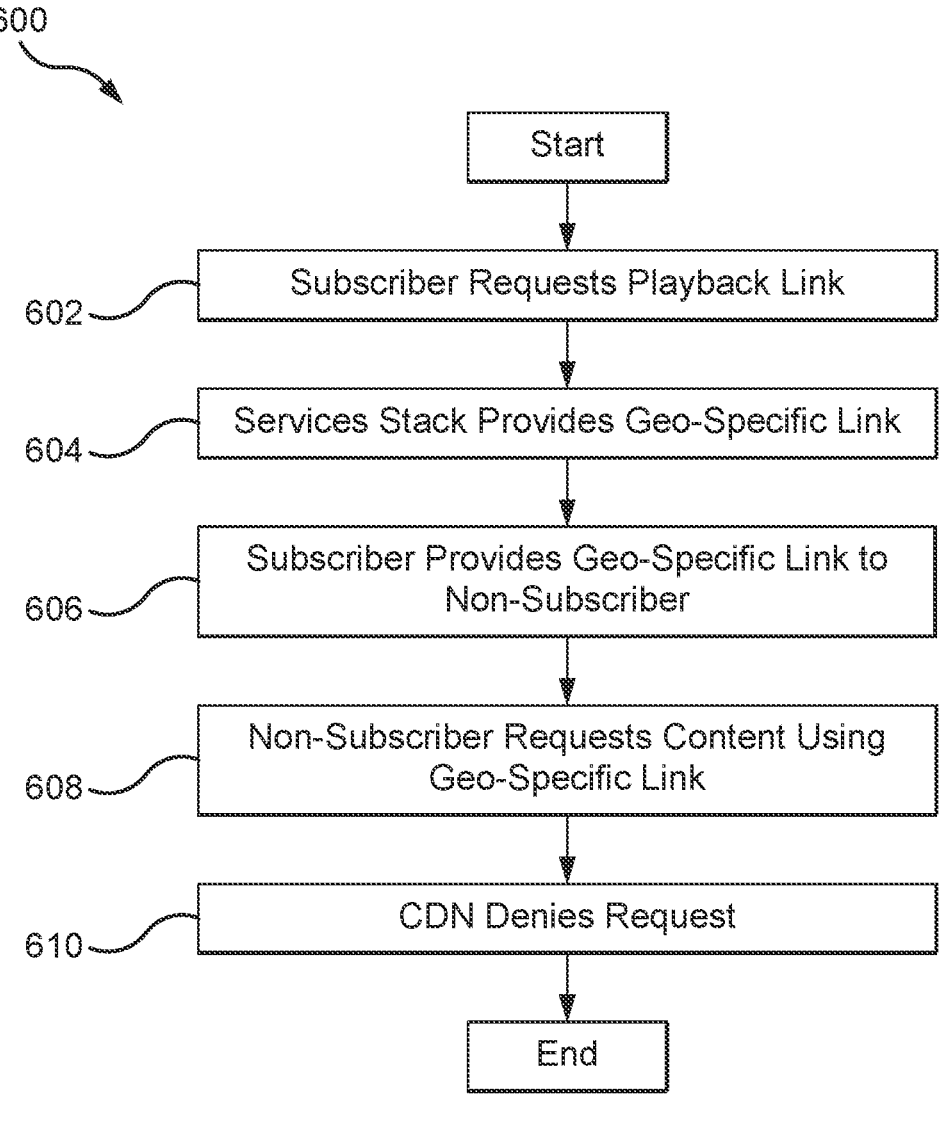
FIG. 6 is a flowchart illustrating attempted geo-locked content delivery to un-authorized users, according to at least one embodiment.

FIG. 6 is a flowchart 600 illustrating attempted geo-locked content delivery to un-authorized users, according to at least one embodiment. In an embodiment, the flowchart 600 is similar to the flowchart 400 illustrated in FIG. 4, except the user requesting content from the CDN is not at the same geographic location as the user accessing the content provider services stack, and so the content is not provided to the user (e.g., the user is assumed to not be a valid subscriber).

At block 602 a subscriber (e.g., the subscriber 302 illustrated in FIG. 3) requests a playback link. For example, the subscriber can transmit a network message to a content provider controller (e.g., the content provider controller 200 illustrated in FIG. 2) using a suitable communication network (e.g., the Internet, a LAN, a WAN, a cellular communication network, or any other suitable communication network).

At block 604, the content provider generates a geo-specific link. In an embodiment, a content link service (e.g., the content link service 212 illustrated in FIG. 2) can use information in the playback link request to identify the geographic location of the subscriber. This is discussed further, above, with regard to FIG. 5. For example, the content link service can use an IP address of the subscriber, or any other suitable information, to identify the geographic location of the subscriber. Further, as discussed above in relation to FIG. 5, the content link service can identify the geographic location at a suitable level of granularity (e.g., city, county, state, residential region, or any other suitable level of granularity). The content link service can generate a token identifying this geographic location, and can include this token in a link provided to the subscriber (e.g., a URL).

At block 606, the subscriber provides the geo-specific link to a non-subscriber. For example, the subscriber could share the link received at block 604 with another entity that is not a subscriber. This could be done intentionally, or unintentionally (e.g., a malicious party could intercept or overhear the transmission of the link).

At block 608, the non-subscriber requests content using the geo-specific link. In an embodiment, the link identifies a content item at a suitable CDN, and the non-subscriber attempts to follow the link the retrieve the content. For example, the geo-specific link can be a URL including a geo-specific token. The non-subscriber can access the URL to attempt to retrieve content from the CDN.

At block 610, the CDN denies the request. In an embodiment, the CDN evaluates the request and determines that the requestor to the CDN is in a different geographic location form the requestor to the content provider services stack, and so the request should not be fulfilled. In an embodiment, the content request from the non-subscriber includes both the current geographic location of the non-subscriber (e.g., an IP address or other geographic identifier) and the geo-specific link generated by the content link service of the content provider (e.g., a URL including a geo-specific token). A CDN verification service (e.g., the CDN verification service 262 illustrated in FIG. 2) compares the current geographic location of the non-subscriber with the expected geographic location recorded in the geo-specific link. The geographic location does not match, and so the CDN denies the request.

In an embodiment, the CDN can take any suitable action as part of denying the request. For example, the CDN can decline to provide the content and provide a suitable error message. Alternatively, or in addition, the CDN can seek additional information from the requestor, ask the requestor to re-request a playback link from the content provider services stack, interface with the content provider services stack to validate the requestor (e.g., exchanging one or more messages between the CDN and content provider services stack), or take any other suitable action. Further, the CDN (or any other aspect of the system) can require the user to revalidate their access to the content (e.g., log in again with a username, password, or other identifying information)

For example, as part of the denying the request the CDN could contact the content provider services stack, the requestor, both, or any other suitable network component, to initiate revalidation of the subscriber. The subscriber could initiate another content request (e.g., automatically or based on user input), and the content provider services stack and CDN could validate the geographic match of this request. This could be used to ensure valid subscribers are not incorrectly blocked from content (e.g., where an error occurs in the geographic validation).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
receiving a first request, from a first user, for a link to streaming content;
determining a defined level of granularity based at least in part on a first property of the first request, wherein the level of granularity is determined to reduce errors for users requesting streaming content compared with a different level of granularity;
determining a geographic location of the first user based on resolving the first property, wherein the geographic location describes a current geographic location at the defined level of granularity;
generating a geo-specific token based on the geographic location of the first user, and;
transmitting the link to the streaming content to the first user, the link comprising the geo-specific token;
receiving a second request for the streaming content based on the link, the second request comprising the geo-specific token; and
denying the second request for the streaming content based on comparing the geo-specific token with additional geographic information determined based on the second request.

2. The method of claim 1, wherein the first request is received at a content provider computational environment and the second request is received at a content delivery network (CDN) different from the content provider computational environment.

3. The method of claim 2, wherein the link to the streaming content comprises a uniform resource locator (URL) including the geo-specific token and identifying a location for the content at the CDN.

4. The method of claim 3, wherein the geographic location of the first user is obfuscated in the geo-specific token.

5. The method of claim 1, wherein
the first property comprises at least one of: (i) an IP address associated with the first user, (ii) a latitude or longitude associated with the first user, (iii) a cellular subscriber identifier associated with the first user, or (iv) a network service provider header associated with the first request.

6. The method of claim 1, wherein generating the geo-specific token based on the geographic location of the first user comprises:
generating a geo-hash based on the geographic location of the first user.

7. The method of claim 1, wherein the first property is a device type indicator.

8. The method of claim 1, wherein denying the second request for the streaming content comprises initiating an additional request for the streaming content by the first user.

9. The method of claim 1, wherein denying the second request for the streaming content based on comparing the geo-specific token with additional geographic information determined based on the second request comprises:
determining a geographic radius based on the geo-specific token;
determining a second geographic location based on the second request; and
determining that the second geographic location does not fall within the geographic location radius.

10. The method of claim 1, further comprising:

receiving a third request for second streaming content from a second user;

determining a second geographic location of the second user based on the third request;

generating a second geo-specific token describing the second geographic location of the second user;

transmitting a second link to the second streaming content to the second user, the second link comprising the second geo-specific token;

receiving a fourth request for the second streaming content based on the second link, the fourth request comprising the second geo-specific token; and granting the fourth request for the second streaming content based on determining that the second geographic location of the second user described in the second geo- specific token matches additional geographic information determined based on the fourth request.

11. A system, comprising:

one or more processors;

one or more memories storing a program, which, when executed on a combination of the one or more processors, performs an operation, the operation comprising:

receiving a first request, from a first user, for a link to streaming content;

determining a defined level of granularity based at least in part on a first property of the first request, wherein the level of granularity is determined to reduce errors for users requesting streaming content compared with a different level of granularity;

determining a geographic location of the first user based on resolving the first property, wherein the geographic location describes a current geographic location at the defined level of granularity;

generating a geo-specific token based on the geographic location of the first user;

transmitting the link to the streaming content to the first user, the link comprising the geo-specific token;

receiving a second request for the streaming content based on the link, the second request comprising the geo-specific token; and denying the second request for the streaming content based on comparing the geo-specific token with additional geographic information determined based on the second request.

12. The system of claim 11, wherein the first request is received at a content provider computational environment and the second request is received at a content delivery network (CDN) different from the content provider computational environment.

13. The system of claim 12, wherein the link to the streaming content comprises a uniform resource locator (URL) including the geo-specific token and identifying a location for the content at the CDN.

14. The system of claim 11, wherein the first property comprising comprises at least one of: (i) an IP address associated with the first user, (ii) a latitude or longitude associated with the first user, (iii) a cellular subscriber identifier associated with the first user, or (iv) a network service provider header associated with the first request.

15. The system of claim 11, wherein denying the second request for the streaming content based on comparing the geo-specific token with additional geographic information determined based on the second request comprises:

determining a geographic radius based on the geo-specific token;

determining a second geographic location based on the second request; and determining that the first second geographic location does not fall within the geographic radius.

16. A non-transitory computer-readable medium containing computer program code that, when executed by operation of one or more computer processors, performs operations comprising:

receiving a first request, from a first user, for a link to streaming content;

determining a defined level of granularity based at least in part on a first property of the first request, wherein the level of granularity is determined to reduce errors for users requesting streaming content compared with a different level of granularity;

determining a geographic location of the first user based on resolving the first property, wherein the geographic location describes a current geographic location at the defined level of granularity;

generating a geo-specific token based on the geographic location of the first user;

transmitting the link to the streaming content to the first user, the link comprising the geo-specific token;

receiving a second request for the streaming content based on the link, the second request comprising the geo-specific token; and denying the second request for the streaming content based on comparing the geo-specific token with additional geographic information determined based on the second request.

17. The non-transitory computer-readable medium of claim 16, wherein the first request is received at a content provider computational environment and the second request is received at a content delivery network (CDN) different from the content provider computational environment.

18. The non-transitory computer-readable medium of claim 17, wherein the link to the streaming content comprises a uniform resource locator (URL) including the geo-specific token and identifying a location for the content at the CDN.

19. The non-transitory computer-readable medium of claim 16, wherein the first property comprising comprises at least one of: (i) an IP address associated with the first user, (ii) a latitude or longitude associated with the first user, (iii) a cellular subscriber identifier associated with the first user, or (iv) a network service provider header associated with the first request.

20. The non-transitory computer-readable medium of claim 16, wherein denying the second request for the streaming content based on comparing the geo-specific token with additional geographic information determined based on the second request comprises:

determining a geographic radius based on the geo-specific token;

determining a second geographic location based on the second request; and determining that the geographic location does not fall within the geographic radius.

* * * * *